G. A. KILEY.
FAUCET.
APPLICATION FILED MAY 19, 1919.
1,372,957.
Patented Mar. 29, 1921.
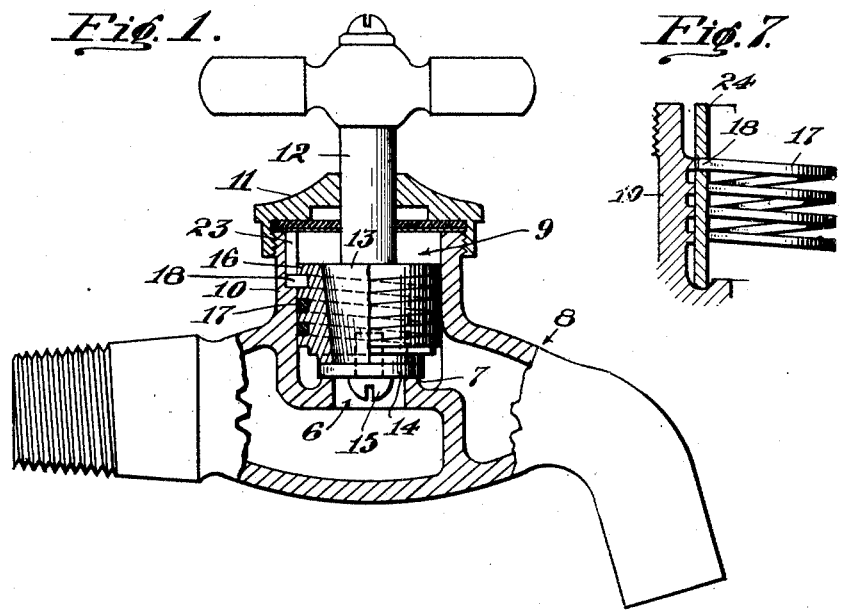
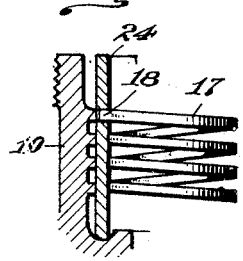
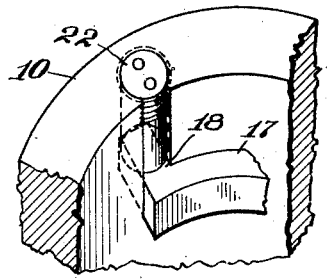
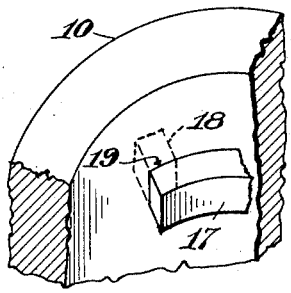
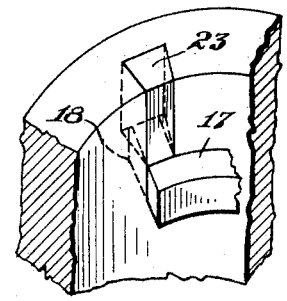
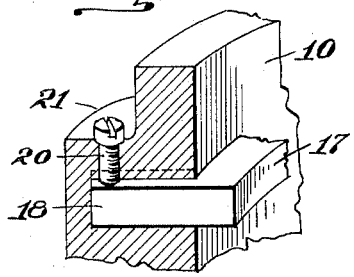
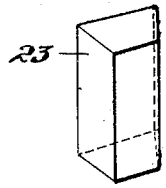
INVENTOR
George A. Kiley
BY
ATTORNEY

UNITED STATES PATENT OFFICE.

GEORGE A. KILEY, OF LOS ANGELES, CALIFORNIA.

FAUCET.

1,372,957.

Specification of Letters Patent. Patented Mar. 29, 1921.

Application filed May 19, 1919. Serial No. 298,095.

*To all whom it may concern:*

Be it known that I, GEORGE A. KILEY, a citizen of the United States, residing at Los Angeles, in the county of Los Angeles and State of California, have invented new and useful Improvements in Faucets, of which the following is a specification.

This invention relates to a faucet, and particularly pertains to a valve mounting therefor of the type embodying a screw threaded engagement between the valve stem and valve casing for advancing and retracting the valve.

In valve mountings of this character the threads quickly become worn, thereby loosening the valve in its mounting causing leakage and also vibration or hammer of the valve.

It is the object of this invention to provide a construction whereby ordinary wear of the threaded mounting will be automatically taken up to obviate leakage and at the same time take up lost motion so as to prevent vibration or hammer of the valve.

Another object is to provide a threaded mounting for screw operated valves which may be readily renewed when excessively worn.

A further object is to provide a resilient threaded mounting for valves which is simple in construction and of such character as to be adapted to be substituted for the ordinary threaded mounting commonly employed in faucets and the like.

Other objects will appear hereinafter.

The invention is illustrated in the accompanying drawings in which:

Figure 1 is a view of the faucet as seen partly in elevation and partly in vertical section and showing the invention as applied.

Figs. 2, 3, 4, and 5 are details in perspective illustrating various manners of detachably mounting the resilient screw thread in the valve casing.

Fig. 6 is a detail in perspective showing the key for engaging the resilient thread as illustrated in Figs. 1 and 4.

Fig. 7 is a detail in section illustrating the invention as adapted for application to the ordinary threaded valve in substituting my demountable resilient thread for the permanent threads with which the faucet is equipped.

Referring to the drawings more particularly, 8 represents a faucet which may be of any suitable construction, and it is here shown as having the usual valve opening 6 and valve seat 7 therein. The faucet is formed with a valve chamber 9 having an externally threaded cylindrical wall 10 to receive the usual threaded cap 11 through which a valve stem 12 slidably extends.

In carrying out my invention the valve stem is formed with a tapered end portion 13 on the lower end of which a packing disk 14 is attached by a screw 15; the packing disk being adapted to seat on the valve seat to close the opening 6. Demountably carried on the tapered end portion 13 on the valve stem is a sleeve 16 having its inner wall tapered to conform to the end of the valve stem whereby frictional engagement between the sleeve and valve stem may be effected. The sleeve 16 is formed with square screw threads on its outer periphery which screw threads are adapted to engage a detachable thread member 17 one end of which is engaged in the wall 10 to hold it against rotation. This thread member is constructed in the form of a spiral spring the coils of which are preferably rectangular in cross section to snugly fit the threads on the sleeve 16. In forming the thread member the spirals thereof are spaced apart a distance either less or greater than the spacing of the threads on the sleeve 16, so that when engaged by the latter the spirals will be placed under tension.

Any suitable means may be provided for securing the thread member in the valve chamber; variety of constructions for this purpose being shown in Figs. 2, 3, 4, and 5.

Fig. 3 illustrates the connection as effected by inserting an out-turned lug 18 on the upper end of the threaded member into a depression 19 formed on the inner face of the wall 10, and Fig. 5 shows a construction substantially corresponding to that illustrated in Fig. 3 excepting that the end of the lug 18 is engaged by a set screw 20 threaded in a boss 21 formed on the outer face of the wall 10, which construction is provided when it is necessary to hold the threaded member against removal. In the construction shown in Fig. 2 the lug 18 is engaged by a threaded plug 22 screwed in the upper end of the wall 10; the inner face of the wall 10 being formed with an open ended slot to receive the lug 18; this slot being threaded to receive the plug 22. In the construction shown in Figs. 1 and 4 the wall 10 is formed with an open ended slot shaped to receive a dove-tailed filler member 23 which is put in place after positioning the lug 18 within the slot. By providing the open ended slots as shown in Figs. 2 and 4 the threaded member need not be contracted in connecting the lug with the wall 10 as would be required by the constructions shown in Figs. 3 and 5.

In assembling the parts the threaded member is first placed in position in the valve chamber and held in place therein by the fastening means. The valve stem with the threaded sleeve is then screwed into engagement with the thread member which operates to expand the thread member in close contact with the inner surface of the wall 10 to effect a tight joint. The cap 11 is then screwed in place.

In the operation of the invention the thread member, being held against longitudinal or rotary movement in the valve chamber, on rotation of the valve 10 the threaded sleeve may be advanced or retracted on the thread member to open or close the valve opening 6. The thread member being under tension operates to oppose free movement of the valve in either direction, and frictionally engages therewith so as to obviate vibration thereof. As the thread member or threaded sleeve wear, this wear will be taken up by expansion of the thread member.

In the form of the invention shown in Fig. 7 the thread member is shown as demountably carried in a sleeve 24 which is adapted to be inserted in the ordinary internally threaded valve chamber of common faucets when it is desired to substitute the demountable thread member for such construction.

While I have shown and described a specific embodiment of my invention it is obvious that various modifications may be resorted to without departing from the spirit of my invention as set forth in the appended claims.

I claim:

1. A valve mounting comprising the combination of a valve casing, a threaded valve stem therein, and a resilient spiral member having one end only engaged with said casing and its spirals free therein and adapted to engage the threads on said valve stem.

2. A valve mounting comprising a valve stem, a demountable externally threaded sleeve on said stem, a casing encircling said sleeve, and a demountable resilient spiral member connected at one terminal only to said casing adapted to be engaged by the threads of said threaded sleeve.

3. A valve comprising a casing having a valve seat therein, a valve for said valve seat, a stem on said valve having a threaded portion, and a resilient spiral detachably mounted in said casing adapted to engage said threaded portion whereby when said stem is rotated said valve will be raised or lowered; the coils of said spiral member being under tension and free to slide lengthwise of the casing.

4. A valve comprising a casing having a valve seat therein and a valve chamber, a valve in said valve chamber for controlling said valve seat, a stem for said valve having an enlarged threaded portion and a thread member detachably mounted in said valve chamber adapted for engagement with said threaded portion whereby when said stem is rotated said valve will be caused to move toward or from its seat; the threads of said member being free from the encompassing wall of the valve chamber.

5. In a valve casing, a valve seat therein, a valve chamber in said casing, a valve in said valve chamber, a stem for said valve, said stem having an enlarged threaded portion and a flexible thread member secured at its upper end to said casing and coiled around the perimeter of said valve chamber with its coils free, said thread member being adapted to engage the threads of said valve member whereby when said stem is rotated said valve will be opened or closed.

GEORGE A. KILEY.